FERROMAGNETIC TUNER

Filed Aug. 4, 1965

INVENTORS
NOZOMU MATSUOKA
MITSUO SUGIMOTO
BY
Buckman and Archer
THEIR ATTORNEYS

INVENTORS
NOZOMU MATSUOKA
MITSUO SUGIMOTO
BY Bucknam and Archer
THEIR ATTORNEYS

INVENTORS
NOZOMU MATSUOKA
MITSUO SUGIMOTO
BY Bucknam and Archer
THEIR ATTORNEYS

United States Patent Office 3,430,175

Patented Feb. 25, 1969

3,430,175

FERROMAGNETIC TUNER

Nozomu Matsuoka, Yao-shi, Osaka-fu, and Mitsuo Sugimoto, Tokyo, Japan

Filed Aug. 4, 1965, Ser. No. 477,217

U.S. Cl. 336—155 7 Claims

Int. Cl. H01f *21/08, 27/28, 27/24*

ABSTRACT OF THE DISCLOSURE

A ferromagnetic tuner which has a ferrite core with an exciting coil and resonant coil thereon. The core has a ratio of $\mu_m/\mu_0$ of more than 3 and a coercive force of less than 1 oersted. The ratio of the cross-section of said core where the exciting coil is wound to the cross-section where the resonant coil is wound is more than 2/1. The resonance frequency of the tuner is changed by varying the current in the exciting coil to change the effective permeability of the core. The variation of current is restricted to the range of permeability wherein the $\mu$-H characteristic curve of the core exhibits decreasing permeability with increasing current through the exciting coil.

This invention relates to a method for frequency tuning within the broadcast band and to an improved tuner comprising a ferrite core having distinctive magnetic properties and a closed shape with specific dimensions.

In general, the tuning circuit to receive broadcasting waves consists of coils and capacitors and heretofore frequency tuning has been performed by mechanical devices that is by changing inductance of a coil or changing capacitance of a capacitor. However, in the present invention frequency tuning is carried out by changing the inductance of coils wound on a place of closed ferrite core by changing of the current in an exciting coil wound at another place on this core.

The tuner of the present invention has many advantages, such as the possibility of continuously and precisely tuning over a wide range of frequencies, the possibility of making it in very small size and at low cost, and further the possibility of remote-controlled tuning between long distance.

The invention will be better understood from the following description taken in conjunction with the accompanying drawing wherein.

Figure 1:
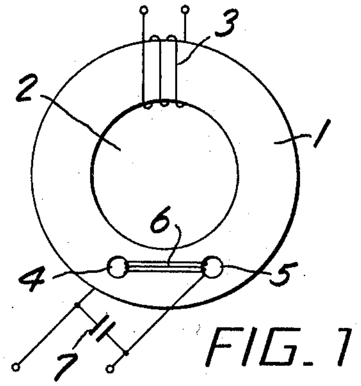
FIGURE 1 is a plan view of the ferro-magnetic tuner of the invention.

Referring to FIG. 1 of the drawing, there is shown the structure of the tuner. The exciting coil 3 is wound through the hole 2, and a resonance coil 6 is wound through other holes 4 and 5 which are punched on a ferrite core as shown in the drawing. When exciting current is passed through the coil 3 and changed gradually by any method, the inductance of coil 6 may be changed. The exciting current may be direct alternating, or pulsed.

Figure 2:
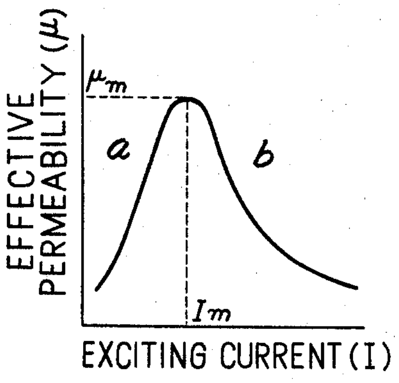
FIGURE 2 is a graph showing the relationship of the effective permeability $\mu$ and the exciting current I of the tuner shown in FIGURE 1.

It has been found that the present tuner, which is provided with a fixed condenser 7 and the coil 6, changes the resonance frequency of the circuit when the exciting current is changed. The relation between exciting current I and the effective permeability $\mu$ is shown in FIG. 2. When receiving broadcasting waves, even if direct current is used for excitation, the relationship between the exciting current and the permeability deviates slightly from the static characteristics. And further, as well known, when alternating or pulse currents are used for exciting, the relation as shown in FIG. 2 will be remarkably changed.

Figure 3:
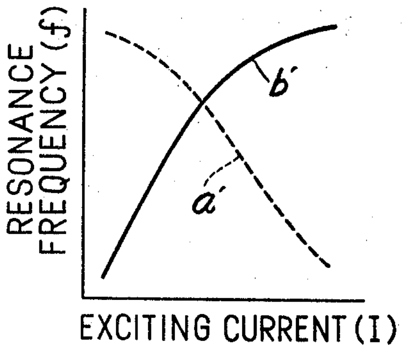
FIGURE 3 is another graph showing the relationship of the resonance frequency ($f$) and the exciting current I of the tuner shown in FIGURE 1.

As also shown in FIG. 2, when the exciting current I is gradually increased from 0 (i.e. curve portion *a* in FIG. 2) up to I*m* (the point of maximum value $\mu m$), the relationship between the exciting current I and the resonance frequency *f* is shown as curve *a'* in FIG. 3.

When the exciting current is further increased from I*m* (along the curve *b* in FIG. 2) up to the current value where $\mu_m$ becomes nearly constant, the relationship between the exciting current I and the resonance frequency *f* is illustrated by curve portion *b'* in FIG. 3.

In FIG. 2, when the portion of the curve *a* is utilized, the relationship between the exciting current and resonance frequency deviates slightly from the static characteristic, after every time the increase and decrease of exciting current are repeated.

Therefore, in this case it is desirable to use a ferrite core having a constant permeability.

On the contrary, when the portion corresponding to the curve *b* of FIG. 2 is utilized, the hysteresis characteristic of the ferrite core becomes so small as can be ignored, and therefore even if the increase and decrease of exciting current should be repeated, it is possible to always tune to the same frequency with the same exciting current value.

Besides, when the ferrite core having property of rectangular hysteresis is employed in the tuner of the present invention, it is possible to make the relationship between the exciting current and the tuning frequency into an approximately straight line.

Therefore, in the ferromagnetic tuner of the present invention, it is preferable to use the portion of curve *b* for magnetizing the said ferrite core.

Especially, when a ferrite with larger hysteresis loss is used for the core, it is particularly necessary to use the magnetizing effect of the curve *b* of FIG. 2.

The present method can be used in modulation circuits, detection circuits, oscillation circuits, amplification circuits and such like high frequency circuits. As to the core material, ferrites with low loss at higher frequency and having high permeability may be used.

According to the present invention, the magnetic property of ferrite governs the efficiency of the tuner, and therefore the selection of it is very important.

The ferrite core used for the tuner of ferro-magnetic tuner of the present invention, should have the following characteristics:

(1) The ratio of $\mu_m/\mu_0$ should be more than 3, and the coercive force, $H_c$, should be less than 1 oersted.

(2) The cross sectional area of the portion of the ferrite core where the coil is wound to change the inductance, should be reduced to less than ½ with respect ferromagnetic tuner should be about 10. However, gening coil is wound.

Namely, when ferrite with a small $\mu_m/\mu_o$ is used in the ferromagnetic tuner of the present invention, it is difficult to change the inductance of the group of coils within a wide range at the same time. For example, for tuning within broadcast band frequency (530–1600 kc./s.), it is necessary to reversibly change the inductance of the resonance coil as much as about 10 times or 1/10.

Therefore, the ratio of $\mu_m/\mu_o$ of ferrite used in the ferromagnetic tuner should be about 10. However, generally speaking, the ratio of $\mu_m/\mu_m$ of ferrite is comparatively small, and those of 3 are common, and therefore the drawback of small $\mu_m/\mu_o$ must be made up by the dimension of ferrite core. When the cross sectional area of the ferrite core where the coil is wound to change the inductance is narrowed less than ½ of the cross sectional area of the said core where the exciting coil is wound, it is possible to change the inductance of the coil in a wide range. However, when the ratio of $\mu_m/\mu_o$ of ferrite is smaller than 3, it is difficult to change the inductance of the coil as much as 10 times, or 1/10, even if the cross-sectional area of the ferrite core where the coil is wound to change the inductance is reduced smaller than ½ of the cross-sectional area of the said core where the exciting coil is wound. Unless the coercive force of ferrite is smaller than one oersted, larger exciting current will be required, and this is not desirable from industrial point of view. The ferrite used in the present invention does not require that it be constituted only from a single kind of material, but some combinations of more than two kinds of materials are very useful. That is to say, it is desirable that the portion on which the exciting coil is wound have high permeability, and that the portion on which is wound the resonance coil, antenna and oscillating coils have high Q. Therefore, when a ferrite core fabricated from high permeability and high Q materials is used in the present tuner, broadcasting waves can be received at high sensitivity.

The following are examples to illustrate the present invention.

Figure 4:
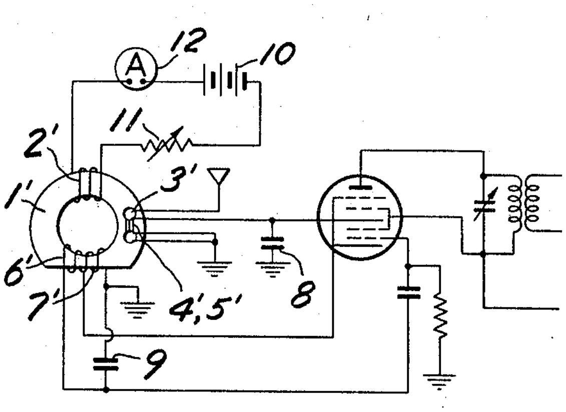
FIG. 4 shows an application invention for B.C. band radio-receiver, and also shows an example of the tuning circuit of the superheterodyne type receiver.

FIG. 4 illustrates a ferromagnetic tuner which employs a ferrite core, showing an application to receive the broadcast band frequency by means of super-heterodyne device.

Figure 5:
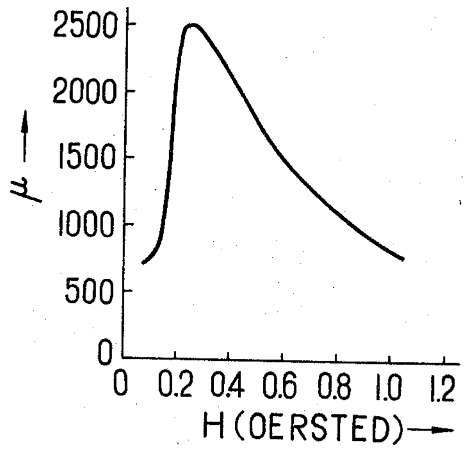
FIG. 5 shows $\mu$-H characteristic of a ferrite employed in the tuner which is shown in FIG. 4.

In this figure, 1 designates a ferrite core having a ring shape; the outside diameter being 10 mm., the inside diameter being 3.5 mm. and the thickness thereof being 3 mm. The composition of the ferrite is 22.5 CuO/27.5 ZnO/0.25 $Bi_2O_3$/49.75 $Fe_2O_3$ and it has been sintered at 1000° C. for 5 hours. The $\mu$-H property thereof is shown in FIG. 5. As is seen in FIG. 5, $\mu_o$ is 700; $\mu_m$ is 2500; and the ratio of $\mu_m/\mu_o$ is about 3.6.

The Q at 500 kc. (in case of ring-shaped core) was 6. The exciting coil 2 was wound 400 turns on the main magnetic circuit of the ferrite core as shown in FIG. 4. 10 designates the direct current source; 11 designates a variable resistance; 12 designates a direct current meter. Two small holes 3 were punched within the main magnetic circuit of the ferrite core 1, the diameters thereof being 1.5 mm., and the distance between the said holes being 3 mm. The antenna coil 4 was wound with 10 turns through the said holes, and the resonance coil 5 was wound with 20 turns thereon, and the said coils were respectively connected to the circuits illustrated in FIG. 4. On the portion where the magnetic circuit is remarkably narrowed by cutting off (in this example the magnetic circuit is narrowed by $\frac{1}{10}$) the oscillating coils 6 and 7 are wound respectively (the number of winding being respectively 80 turns and 15 turns). 8 and 9 are respectively, fixed capacitors which replace the variable capacitor of the conventional method. The said fixed capacitors 8 and 9 are 250 pf. and 200 pf. The resonance circuit may initially consist of the resonance coil 5 and the capacitor 8 tuned at 500 kc. by changing the exciting current circulated through the coil 2, and at the same time the oscillating circuit consists of two coils, coils 6 and 7, and the capacitor 9 is tuned at 965 kc. Then, it is possible to tune to a higher frequency than 500 kc., or 965 kc., by means of gradually increasing the exciting current in coil 2. Thus it is possible to receive all the broadcasting waves of the broadcast band with high sensitivity. The relationship between the exciting current and tuning frequency at that time is shown by the curve 1 in FIG. 6.

Figure 6:
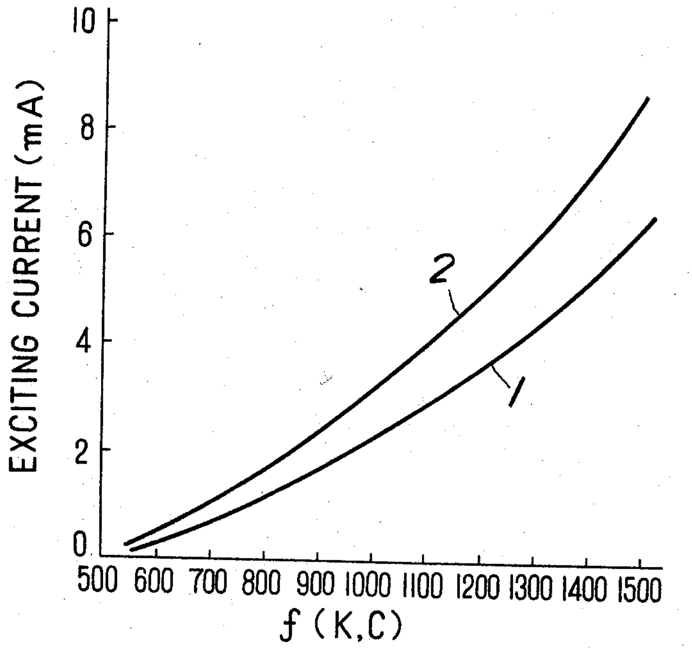
FIG. 6 shows the relation between the exciting current and the tuning frequency of the ferromagnetic tuner as shown in FIG. 7.

In other words, it is possible to tune to all the frequencies of the broadcast band by a slight change of current from 0.1 to 6.3 ma. Since the exciting current was changed within a range of current value bigger than $Im$, the constant relationship between $f$ and I as shown in FIG. 6 can be always kept correctly even if the exciting current is reversibly changed. If a ferrite core having a rectangular hysteresis characteristic should be used, the relation between the exciting current and resonance frequency in FIG. 6 can be made straight line (direct ratio).

When the cross sectional area of the portion of the magnetic core where the antenna, resonance and oscillating coils are wound is made remarkably smaller than the cross sectional area of the magnetic circuit where the exciting coil is wound, the inductance of each coil, except the exciting coil, can be changed within a wide range by small changes of the exciting current. And even when a ferrite core having a small ratio of $\mu_o$ and $\mu_m$ is employed, it is possible to change the inductance within a wide range by means of remarkably enlarging the ratio of cross sectional areas. (As to the two small holes 2, when the distance between them is made closer, the effective cross sectional area of that portion can be made smaller.)

As above mentioned, it is preferable to wind the antenna, resonance and oscillating coils on the ferrite core whose cross sectional area is less than half of the cross sectional area of the said core where exciting coil is wound.

In order to receive broadcasting waves with high sensitivity, it is preferable to wind at an almost perpendicular direction between the antenna, resonance coil group and oscillating coil as to the direction of magnetic flux passing through the ferrite core, generated from the exciting coil as shown in FIG. 4. If it proves that the inductances of coils wound at the perpendicular direction as to the direction of magnetic flux in the core do not change sufficiently, then all coils to change the inductances can be wound in the same direction relative to the direction of magnetic flux after due consideration on the magnetic disturbance between each other coils. For example, the resonance, antenna, and oscillating coils may be wound respectively on the same portion, such remarkably smaller portion as illustrated in FIG. 4, keeping some small interval between each other.

Figure 7:
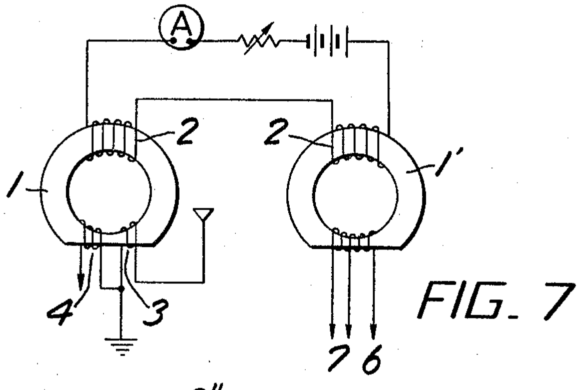
FIG. 7 shows another application of the present invention, and also shows the tuning method using two ferrite cores with ring shape to receive BC band frequency by means of a superheterodyne device.

In FIG. 4, it is also possible to replace a variable resistance 11 with a fixed resistance group and a switch. Also, as shown in FIG. 7, it is possible to employ two ring shaped ferrite cores 1 and 1', on one of them winding antenna and tuning coils 3 and 4 with 15 and 50 turns respectively, and on the other of them winding oscillating coils 6 and 7 with 80 and 10 turns, respectively. The exciting coil 2 is connected to the cores in parallel (or in series). In this example the relationship between the exciting current and tuning frequency is shown by the curve 2 in FIG. 6. In order to eliminate the painstaking labour to wind coil around the said ferromagnetic tuner, the ferrite cores with the shape of EI type, a bar type, or a pot type can be used.

Figure 8:
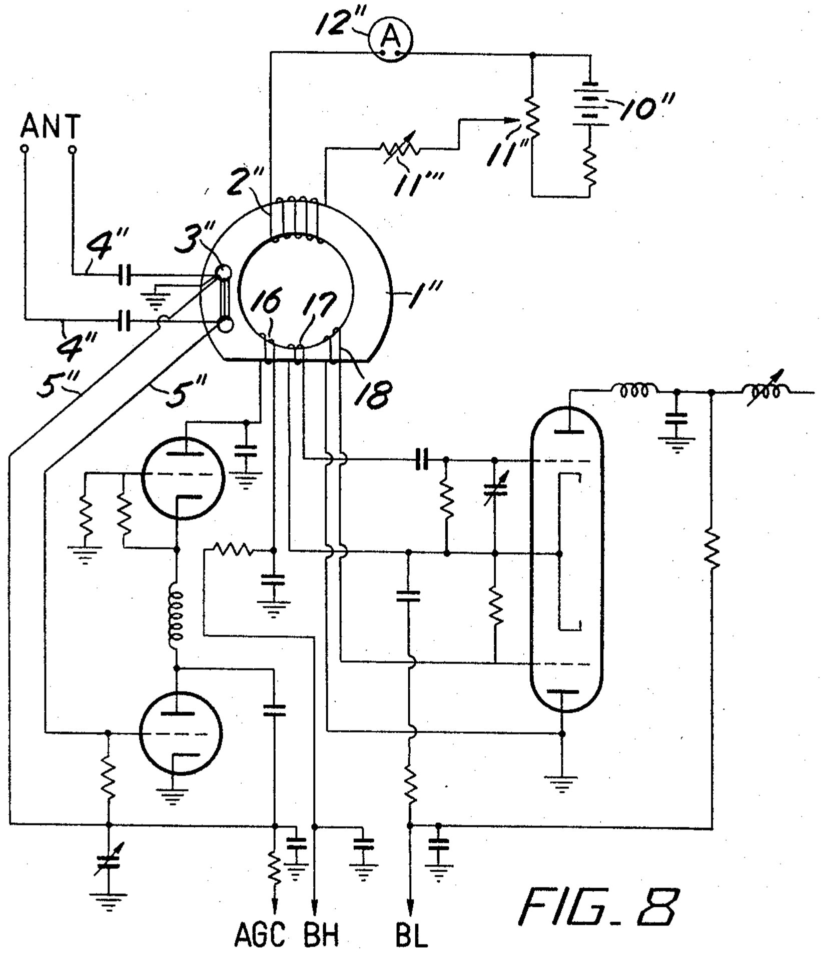
FIG. 8 shows the tuning circuit wherein the present ferromagnetic tuner is applied to a TV receiver.

FIG. 8 shows an example of the said tuner for receiving television waves. The ring-shaped ferrite core 1'' has an outside diameter of 10 mm., an inside diameter being 3.5 mm., and two small holes are provided on a part of the main magnetic circuit thereof, the diameter of the said small holes being 1 mm., and the distance between the two small holes being 3 mm. The composition of the said ferrite is 10MgO/15NiO/25ZnO/50$Fe_2O_3$, and it has been sintered at 1350° C. in air; the $\mu o$ thereof being 100, the $\mu_m$ thereof being 550; and the Q at 100 mc. being 20. 2″ is the exciting coil, the number of turns thereof being 700; 10″ is the direct current source thereof; 11″ and 11‴ are respectively variable resistances, and 11‴ is a resistance for adjusting exciting current by a minute amount for precisely receiving television waves; 12″ is a direct current meter; in the two holes 3″, antenna coil 4″ and resonance coil 5″ are wound, and the intermediate tap of the antenna coil is grounded. The coupling coils 16 and 17 are respectively wound 5 turns closely on the portion of the ferrite core which is made remarkably smaller about 1/10 than the cross sectional area where the exciting coil 2″ is wound. On the narrow portion of the core, a little apart from the coupling coil group, the oscillating coil 18 is wound 5 turns. In the arrangement of coils as shown in this drawing when the exciting current through coil 2″ was increased or decreased, within a range of 5–110 ma., it was possible to obtain the clear video and audio signals of television.

In all above examples Cu-Zn or Ni-Zn ferrite are desirable for receiving of AM broadcasting frequencies in the present invention, and Ni-Zn, Mg-Zn, Li-Zn ferrites are desirable for receiving FM and television broadcasting.

As described in detail, the ferromagnetic tuner of the present invention can be easily made in compact sizes in comparison with the conventional tuners, and it is also possible to tuning precisely and continuously, and to make uniform the indication of the receiving frequency, and tuning of remote control tuning over long distances is possible. Furthermore, the cost of production thereof will be less and other excellent properties are possessed by the present tuner.

What is claimed is:

1. A method of varying the resonance frequency of a tuner having a ferrite core with at least an exciting coil and a resonant coil thereon, comprising varying the current in said exciting coil to change the effective permeability of said core, said variation of current being restricted to the range of permeability wherein the $\mu$-H characteristic curve of said core exhibits decreasing permeability with increasing current through the exciting coil, said core having the ratio of $\mu_m/\mu_o$ of more than 3, a coercive force of less than 1 oersted, and the ratio of the cross section of said core where the exciting coil is wound to the cross section where the resonant coil is wound to change inductance being more than 2/1.

2. A ferromagnetic tuner having a ferrite core with at least an exciting coil and resonant coil thereon, said core having a ratio of $\mu_m/\mu_o$ of more than 3, a coercive force of less than 1 oersted, and the ratio of the cross-section of said core where the exciting coil is wound to the cross-section where the resonant coil is wound to change inductance being more than 2/1.

3. A tuner according to claim 2, in which the resonant coil is wound on a closed core perpendicularly or in the same direction as the direction of the magnetic flux which passes through the closed core, so that its inductance is changed by means of changes of the exciting current.

4. A tuner according to claim 2, in which the ferrite core consists of at least two kinds of materials of high permeability ferrite and high Q ferrite, said ferrite core having the cross sectional ratio of more than 2/1 of the cross section of said core where the exciting coil is wound to the cross section where the resonant coil is wound to change inductance.

5. A tuner according to claim 2, wherein direct current is applied to the exciting coil.

6. A tuner according to claim 2, wherein alternating current is applied to the exciting coil.

7. A tuner according to claim 2, wherein pulsed current is applied to the exciting coil.

References Cited

UNITED STATES PATENTS 3,146,393 8/1964 Gibbon -------- 336—229 XR

OTHER REFERENCES

Bozonth, "Ferromagnetism," D. Van Nostrand Company, Inc., March 1951, pp. 870–871 relied upon.

LEWIS H. MYERS, *Primary Examiner.*

T. J. KOZME, *Assistant Examiner.*

U.S. Cl. X.R.

334—12; 325—383; 336—233, 229